(12) United States Patent
Hollier

(10) Patent No.: US 7,015,947 B1
(45) Date of Patent: Mar. 21, 2006

(54) MEASUREMENT OF PERFORMANCE OF COMMUNICATIONS SYSTEMS

(75) Inventor: Michael P. Hollier, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/701,514

(22) PCT Filed: Jun. 15, 1999

(86) PCT No.: PCT/GB99/01894

§ 371 (c)(1),
(2), (4) Date: Nov. 30, 2000

(87) PCT Pub. No.: WO00/01165

PCT Pub. Date: Jan. 6, 2000

(30) Foreign Application Priority Data

Jun. 29, 1998 (EP) .................................. 98305107

(51) Int. Cl.
*H04N 17/00* (2006.01)
(52) U.S. Cl. .................................................... 348/180
(58) Field of Classification Search ................ 348/180, 348/192, 193, 194, 189, 515; 345/473, 474, 345/475; 381/71.1, 94.7, 94.1, 94.2, 94.3; 704/201, 243
See application file for complete search history.

(56) References Cited

U.S. PATENT DOCUMENTS

| | | | | |
|---|---|---|---|---|
| 4,313,135 A | * | 1/1982 | Cooper | 348/512 |
| 4,455,634 A | * | 6/1984 | Efron et al. | 369/53.41 |
| 4,598,324 A | * | 7/1986 | Efron et al. | 386/54 |
| RE33,535 E | * | 2/1991 | Cooper | 348/512 |
| 5,040,081 A | * | 8/1991 | McCutchen | 386/66 |
| 5,446,492 A | * | 8/1995 | Wolf et al. | 348/192 |
| 5,473,361 A | * | 12/1995 | Penney | 725/143 |
| 5,572,261 A | * | 11/1996 | Cooper | 348/512 |
| 5,574,500 A | * | 11/1996 | Hamada et al. | 348/180 |
| 5,596,364 A | * | 1/1997 | Wolf et al. | 348/192 |
| 5,617,137 A | * | 4/1997 | Whitlow | 348/193 |
| 5,621,854 A | * | 4/1997 | Hollier | 704/200.1 |
| 5,794,188 A | * | 8/1998 | Hollier | 704/228 |
| 5,848,384 A | * | 12/1998 | Hollier et al. | 704/231 |
| 5,883,665 A | * | 3/1999 | Galler et al. | 348/192 |
| 5,890,104 A | * | 3/1999 | Hollier | 704/201 |
| 5,940,124 A | * | 8/1999 | Janko et al. | 348/189 |
| 6,075,561 A | * | 6/2000 | Janko | 348/180 |
| 6,092,040 A | * | 7/2000 | Voran | 704/228 |
| 6,119,083 A | * | 9/2000 | Hollier et al. | 704/243 |
| 6,177,928 B1 | * | 1/2001 | Basso et al. | 345/302 |
| 6,239,834 B1 | * | 5/2001 | Miyaji et al. | 348/193 |
| 6,466,213 B1 | * | 10/2002 | Bickmore et al. | 345/473 |
| 6,493,023 B1 | * | 12/2002 | Watson | 348/180 |

* cited by examiner

Primary Examiner—Paulos M. Natnael
(74) Attorney, Agent, or Firm—Nixon & Vanderhye P.C.

(57) ABSTRACT

The subjective quality of an audio-visual stimulus is measured by measuring the actual synchronisation errors between the audio and visual elements of the stimulus, identifying characteristics of audio and visual cues in the stimulus, and generating a measure of subjective quality from said errors and characteristics. The nature of the cue has an effect on the perceptual significance of a given value of synchronisation error, and this can be used to relax tolerances to such errors when appropriate, or to provide an accurate measure of the quality of the signal as it would be perceived by a human subject.

12 Claims, 5 Drawing Sheets

US 7,015,947 B1

MEASUREMENT OF PERFORMANCE OF COMMUNICATIONS SYSTEMS

FIELD OF THE INVENTION

This invention relates to signal processing. It is of application to the testing of communications systems and installations, and to other uses as will be described. The term "communications system" covers telephone or television networks and equipment, public address systems, computer interfaces, and the like.

BACKGROUND OF THE INVENTION

It is desirable to use objective, repeatable, performance metrics to assess the acceptability of performance at the design, commissioning, and monitoring stages of communications services provision. However, a key aspect of system performance is the measurement of subjective quality, which is central in determining customer satisfaction with products and services. The complexity of modern communications and broadcast systems, and in particular the use of data reduction techniques, renders conventional engineering metrics inadequate for the reliable prediction of perceived performance. Subjective testing using human observers is expensive, time consuming and often impractical, particularly for field use. Objective assessment of the perceived (subjective) performance of complex systems has been enabled by the development of a new generation of measurement techniques, which emulate the properties of the human senses. For example, a poor value of an objective measure such as signal-to-noise performance may result from an inaudible distortion. A model of the masking that occurs in hearing is capable of distinguishing between audible and inaudible distortions.

The use of models of the human senses to provide improved understanding of subjective performance is known as perceptual modelling. The present applicants have a series of previous patent applications referring to perceptual models, and test signals suitable for non-linear speech systems, including WO 94/00922, WO 95/01011 and WO 95/15035.

To determine the subjective relevance of errors in audio systems, and particularly speech systems, assessment algorithms have been developed based on models of human hearing. The prediction of audible differences between a degraded signal and a reference signal can be thought of as the sensory layer of a perceptual analysis, while the subsequent categorisation of audible errors according to their subjective effect on overall signal quality can be thought of as the perceptual layer.

An approach similar to this auditory perceptual model has also been adopted for a visual perceptual model. In this case the sensory layer reproduces the gross psychophysics of the sensory mechanisms, in particular spatio-temporal sensitivity (known as the human visual filter), and masking due to spatial frequency, orientation and temporal frequency.

A number of visual perceptual models are under development and several have been proposed in the literature.

The subjective performance of multi-modal systems depends not only on the quality of the individual audio and video components, but also on interactions between them. Such effects include "quality mis-match", in which the quality presented in one modality influences perception in another modality. This effect increases with the quality mis-match.

The information content of the signal is also important. This is related to the task undertaken but can vary during the task. For present purposes, "content" refers to the nature of the audio-visual material during any given part of the task.

The type of task or activity undertaken also has a substantial effect on perceived performance. As a simple example, if the video component dominates for a given task then errors in the video part will be of greatest significance. At the same time audio errors which have high attentional salience (are "attention grabbing") will also become important. The nature of the task undertaken influences the split of attention between the modalities, although this may also vary more randomly if the task is undemanding.

However, important though these factors are, they are in general difficult to define, and to use for making objective measurements. Nevertheless, the inventor has identified some cross-modal effects which can be derived from objective measurements.

SUMMARY OF THE INVENTION

A further application of the invention is in the real-time generation of audio-visual events in virtual environments, in particular real-time optimisation of synthetic people such as animated taking faces. The process may be used in particular for the matching of synthetic head visemes (mouth shape) transitions with the acoustic waveforms data generating the speech to be represented, thereby generating more realistic avatars.

According to the invention there is provided a method of determining the subjective quality of an audio-visual stimulus, comprising the steps of:

measuring the actual synchronisation errors between the audio and visual elements of the stimulus, identifying characteristics of audio and visual cues in the stimulus, and generating a measure of subjective quality from said errors and characteristics.

According to another aspect there is provided apparatus for determining the subjective quality of an audio-visual stimulus, comprising means for measuring the actual synchronisation errors between the audio and visual elements of the stimulus, means for the identification of characteristics of audio and visual cues in the stimulus, and means for generating a measure of subjective quality from said synchronisation errors and characteristics.

It has been observed experimentally that human subjects have different sensitivities to a given synchronisation error, depending on the type of cue with which it is associated. Thus, poorly-synchronised stimuli containing certain cue types will be perceived as of lower quality than equally poorly-synchronised stimuli containing other cue types. Synchronisation tolerances have been an essential consideration in television broadcasting for many years. However, for emerging telepresence technologies, synchronisation must be dynamically controlled. Audio/video synchronisation error detection is dependent on the task undertaken, the nature of the stimulus (content) and whether the error results in the audio leading or lagging the video [*ITU-T Recommendation J.100, "Tolerances for transmission time differences between vision and sound components of a television signal"*, 1990].

Results to be presented later in this specification illustrate that the synchronisation tolerances can be relaxed for certain types of content and that the subjectivity of synchronisation error remains relatively low over a much greater range of values for these types.

Although, in general, information content is not measurable by an objective test, certain cue types have been identified on which human sensitivity to synchronisation error depends, and which are distinguishable by such tests.

Synchronisation errors are also relatively easy to measure, so the invention allows a network operator to determine by objective measures whether the current error is perceptually significant, having regard to the nature of the cue.

The characteristics of the audio and visual cues are preferably used to generate one or more synchronisation error tolerances values, which may correspond to different degrees of perceptual error, for example as measured by human subjects. The audio-visual stimulus can be monitored for occurrences by human subjects. The audio-visual stimulus can be monitored for occurrences of synchronisation errors exceeding such tolerances values to provide a quantitative output. The means generating the stimulus may be controlled dynamically to maintain the synchronisation in a predetermined relationship with the said tolerance values, for example by buffering the earlier-arriving stimulus or by omitting elements from the later-arriving one to bring them into synchronism. Maintenance of synchronisation can make considerable demands on an audio-visual system. Buffering requires a memory capacity. Alternatively, if channels are congested, data packets of one or other channel (sound or vision) may have to be sacrificed to maintain synchronisation to a given level, reducing the signal quality of that channel. Therefore, if a more relaxed tolerance level can be applied at certain times, greater synchronisation errors can be allowed, thereby reducing the required channel capacity and/or the amount of lost data.

Where there are several channels in use, each carrying different stimulus types, they may be controlled such that they all have the same perceptual quality value, although the synchronisation errors themselves may be different.

A further application of the invention is in the real-time generation of audio-visual events in virtual environments, in particular real-time optimisation of synthetic people such as animated talking faces. The process may be used in particular for the matching of synthetic head visemes (mouth shape) transitions with the acoustic waveform data generating the speech to be represented, thereby generating ore realistic avatars.

BRIEF DESCRIPTION OF THE DRAWINGS

An embodiment of the invention will now be described, by way of example only, with reference to the Figures.

DETAILED DESCRIPTION OF THE INVENTION

Figure 2:
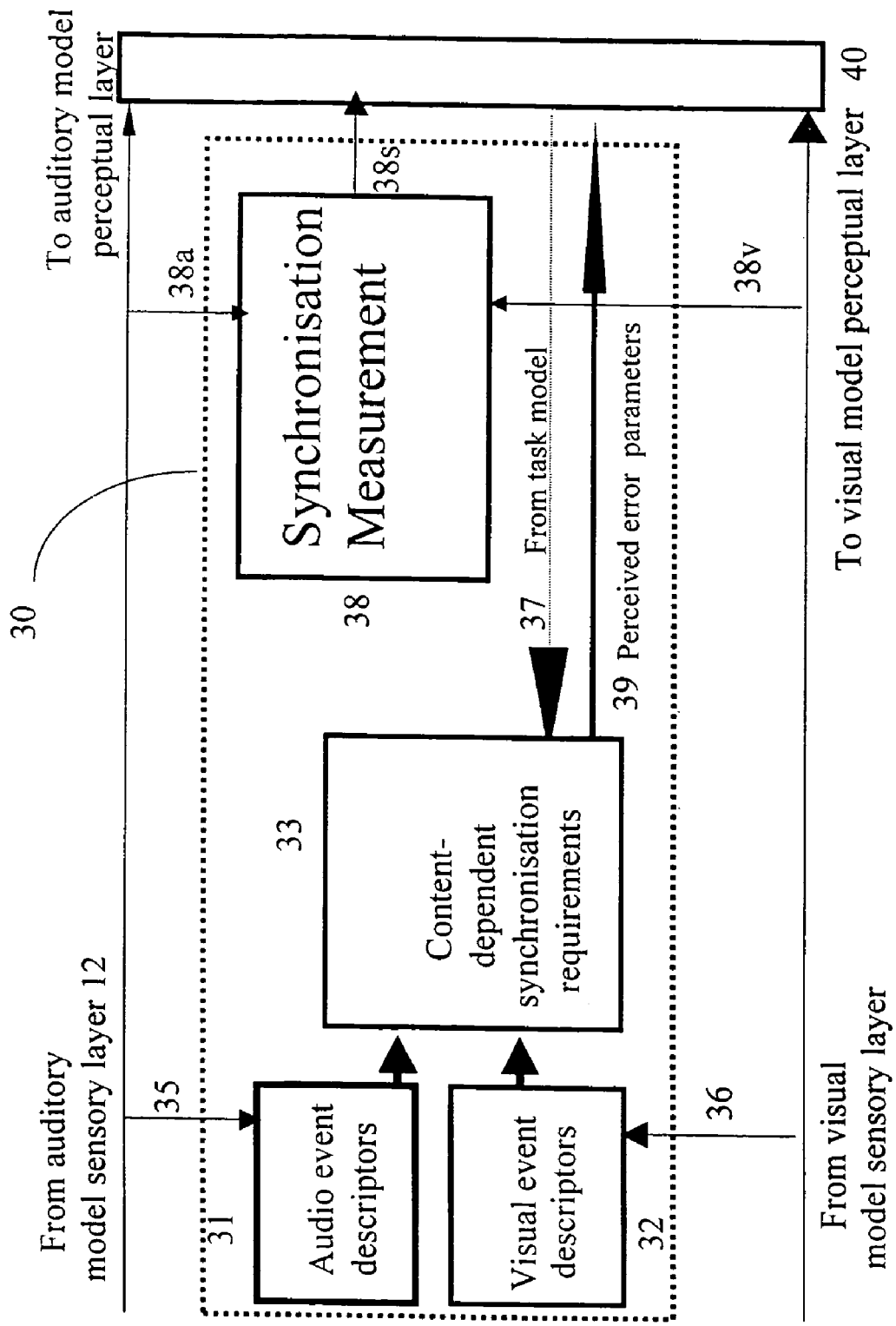
FIG. 2 shows a synchronisation perception measurement component of the system of FIG. 1.

One key component of the multi-model of the present invention is synchronisation. This part of the model is shown in FIG. 2. The degree of synchronisation between the inputs is determined in a synchronisation measurement unit 38. This takes inputs from the visual sensory layer (input 38$v$) and the audible sensory layer (input 38$a$) relating to the respective delays in the two signals. The synchronisation measurement unit 38 determines the differences in these two delays and generates an output 38$s$ representative of the relative delay between the two signals. This, rather than the absolute delay in either signal, is the perceptually significant. Such lack of synchronisation has been determined in prior art systems but, as will be discussed, the perceptual importance of such synchronisation errors varies according to the nature of the stimulus.

Figure 1:
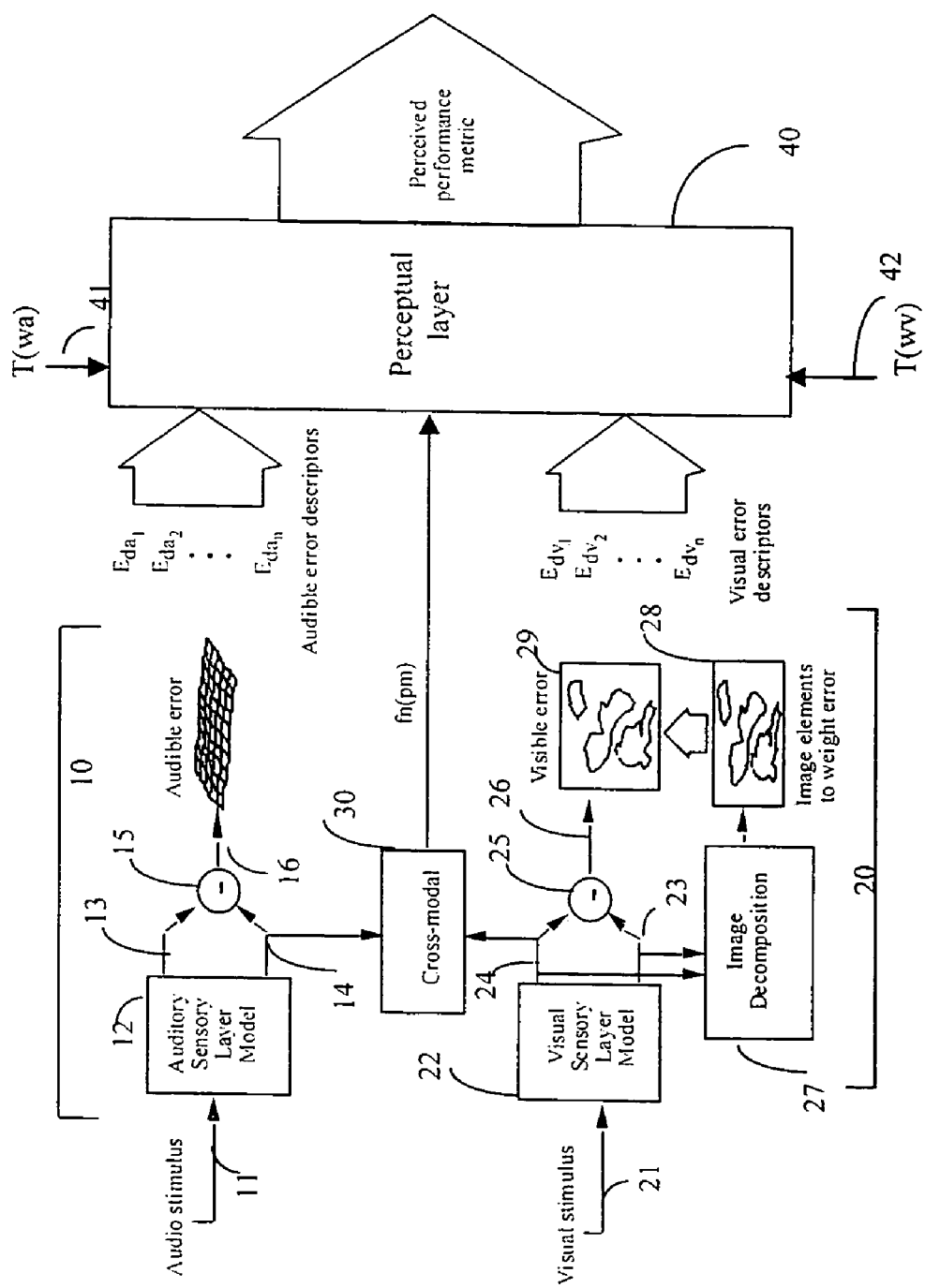
FIG. 1 shows in schematic form the principal components of a multi-sensory perceptual measurement system.

A suitable architecture for a multi-sensory model is shown in FIG. 1. The main components are:

auditory and visual sensory models 10, 20;

a cross-modal model 30, The cross-modal 30 includes a synchronisation perceptual model shown in detail in FIG. 2 a scenario-specific perceptual layer 40.

An auditory sensory layer model component 10 comprises an input 11 for the audio stimulus, which is provided to an auditory sensory layer model 12. The auditory model 12 measures the perceptual importance of the various auditory bands and time elements of the stimulus, and generates an output 16 representative of the audible error as a function of auditory band (pitch) and time. This audible error may be derived by comparison of the perceptually modified audio stimulus 13 and a reference signal 14, the difference being determined by a subtraction unit 15 to provide an output 16 in the form of a matrix of subjective error as a function of auditory band and time, defined by a series of coefficient $E_{da1}, E_{da2}, \ldots, E_{dan}$. Alternatively the model may produce the output 16 without the use of a reference signal, for example according to the method described in International patent specification number WO96/06496.

A similar process takes place with respect to the visual sensory layer model 20. An input 21 for the visual stimulus is provided to a visual sensory layer model 22, which generates an output 26 representative of the visible error. This error may be derived by comparison of the perceptually modified visual stimulus 23 nd a reference signal 24, the difference being determined by a subtraction unit 25 to provide an output 28 in the form of a matrix of subjective error, defined by a series of coefficients $E_{dv1}, E_{dv2}, \ldots, E_{dvn}$. However, in this context a further step is required. The image generated by the visual sensor layer model 22 is also analysed in an image decomposition unit 27 to identify elements in which errors are particularly significant, and weigthed accordingly, as described in international patent specification number WO97/32428. This provides a weighting function for those elements of the image which are perceptually the most important. In particular, boundaries are perceptually more important than errors within the body of an image element. The weighting functions generated in the weighting generator 28 are then applied to the output 26 in a visible error calculation unit 29 to produce a "visible error matrix" analogous to that of the audible error matrix described above. The matrix can be defined by a series of coefficients $E_{dv1}, E_{dv2}, \ldots, E_{dvn}$. Images are themselves two-dimensional, so for a moving image the visible error matrix will have at least three dimensions.

It should also be noted that the individual coefficients in the audible and visible error matrices may be vector properties.

There are a number of cross-modal effects which can affect the perceived quality of the signal. The effects to be modelled by the cross-modal model 30 may include the quality balance between modalities (vision and audio) and timing effects correlating between the modalities. Such timing effects include sequencing (event sequences in one modality affecting user sensitivity to events in another) and synchronisation (correlation between events in different modalities).

One key component of the multi-modal model of the present invention is synchronisation. This part of the model is shown in FIG. 2. The degree of synchronisation between the inputs is determined in a synchronisation measurement unit 38. This takes inputs from the visual sensory layer (input 38v) and the audible sensory layer (input 38a) relating to the respective delays in the two signals. The synchronisation measurement unit 38 determines the difference in the two delays and generates an output 38v representative of the relative delay between the two signals. This, rather than the absolute delay in either signal, is the perceptually significant. Such lack of synchronisation has been determined in prior art systems but, as will be discussed, the perceptual importance of such synchronisation errors varies according to the nature of the stimulus.

To this end, the cross-modal model 300 also uses information about the audio and video data streams (inputs 35, 36), and optionally the task being undertaken, (input 37) to determine the subjectively of any synchronisation errors.

In this embodiment the objective parameters describing the audio components of the signals are audio descriptors generated from the input 35 in processor 31. These audio descriptors are RMS energy over a succession of overlapping short intervals of predetermined length, and signal peak and decay parameters. These values give an indication of the general shape and duration of individual audio events.

The parameters describing the video components are video descriptors generated from the input 36 in a processor 32, such as motion vectors, see for example chapter 5 in [Netravali A N, Haskell B G, "Digital Pictures; representation and compression", Plenum Press, ISBN 0-306-42791-5. June 1991], and a persistence parameter describing the subjective importance, and the decay of this importance with time.

These parameters are used by a further processor 33 to determine the nature of the content of the stimulus, and generate therefrom a synchronisation error perceptibility value, which is output (39) to the perceptual model 40, along with the actual value of the synchronisation error (output 38s). The perceptual model 40 can then compare the synchronisation error value with the perceptibility value to generate a perceptual quality value, which contributes to a cross-modal combining function $fn_{pm}$ to be used by the perceptual model 40.

A mathematical structure for the model can be summarised:

$E_{da1}, E_{da2}, \ldots, E_{dan}$ are the audio error descriptors, and
$E_{dv1}, E_{dv2}, \ldots, E_{dvn}$ are the video error descriptors.

Then, for a given task:

$fn_{aws}$ is the weighted function to calculate audio error subjectivity, $fn_{vws}$ is the weighted function to calculate video error subjectivity, and $fn_{pm}$ is the cross-modal combining function previously discussed. This function may include other weightings, to account for other cross-modal factors, for example quality mismatches and task-related factors.

The task-specific perceived performance metric, PM, output from the model 40 is then:

$$PM = fn_{pm} [fn_{aws} \{E_{da1}, E_{da2}, \ldots, E_{dan}\}, fn_{vws} \{E_{dv1}, E_{dv2}, \ldots, E_{dvn}\}]$$

The perceptual layer modal 40 may be configured for a specific task, or may be configurable by additional variable inputs $T_{wa}, T_{wv}$ to the model (inputs 41, 42), indicative of the nature of the task to be carried out, which varies the weightings in the function $fn_{pm}$ according to the task. For example, in a video-conferencing facility, the quality of the audio signal is generally more important than that of the visual signal. However, if the video conference switches from a view of the individuals taking part in the conference to a document to be studied, the visual significance of the image becomes more important, affecting what weighting is appropriate between the visual and auditory elements. These values $T_{wa}, T_{wv}$ may also be fed back to the synchronisation perception measuring function 38, to allow the synchronisation error subjectivity to vary according to the task involved. High level cognitive preconceptions associated with the task, the attention split between modalities, the degree of stress introduced by the task, and the level of experience of the user all have an effect on the subjective perception of quality.

The functions $fn_{aws}, fn_{vws}$ may themselves be made functions of the task weightings, allowing the relative importance of individual coefficients $E_{da1}, E_{dv1}$ etc to be varied according to the task involved giving a prediction of the performance metric, PM' as:

$$PM' = fn'_{pm} [fn'_{aws} \{E_{da1}, E_{da2}, \ldots, E_{dan}, T_{wa}\}, fn'_{vws} \{E_{dv1}, E_{dv2}, \ldots, E_{dvn}, T_{wv}\}]$$

A multi-dimensional description of the error subjectivity in the auditory and visual modalities is thereby produced.

Figure 5:
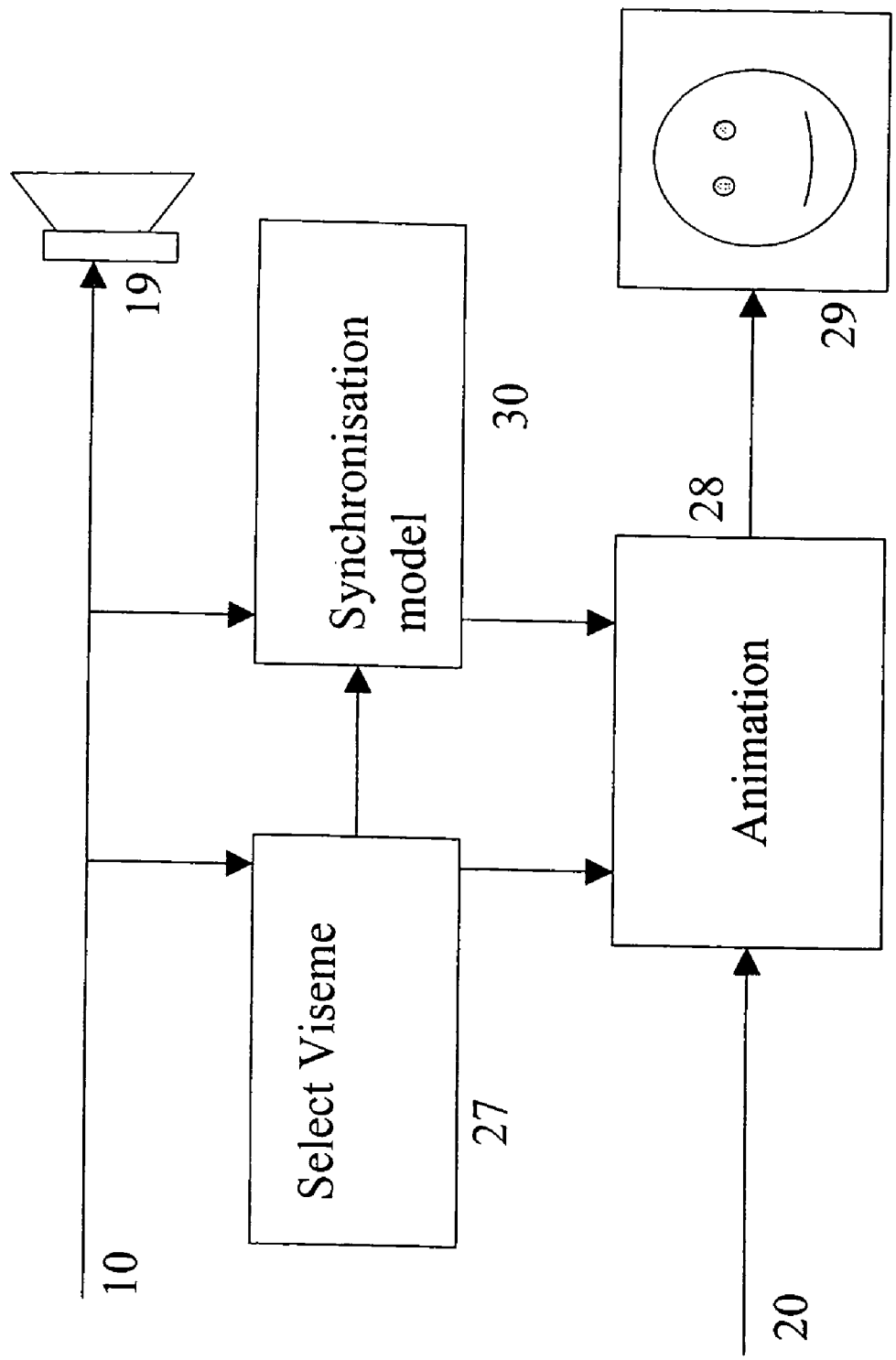
FIG. 5 illustrates schematically the use of the system of FIG. 2 in generating visemes for an avatar.

In the arrangement of FIG. 5 an avatar 29 represented on a screen is generated from an audio input 10, from which the speech content is derived, and an input 20 which provides the basic gesture data for the animiation of the avatar in the animation unit 28. The audio input 10 is also supplied to a speaker system 19, and to the animation process. The process requires the selection of the viseme (facial arrangement) appropriate to the sound being uttered (element 27) and this is used to control the animation unit 28. It is desirable to have the visemes synchronised with the sound, but the animation process makes this difficult to achieve. Some visemes are more tolerant of synchronisation errors than others, and so by applying the audio input 10 and the identity of the selected viseme to the synchronisation model 30 (FIG. 2) this tolerance can be determined, and used to control the animation process 28, for example by extending or shortening the duration of the more tolerant visemes, to allow better synchronisation of the less-tolerant visemes.

In these embodiments the values derived in the processor 33 depend on the stimulus type. A selection of experimental results showing this inter-relationship is presented below in order to illustrate the influences of stimulus on the perceptual relevance of synchronisation errors.

Figure 3:
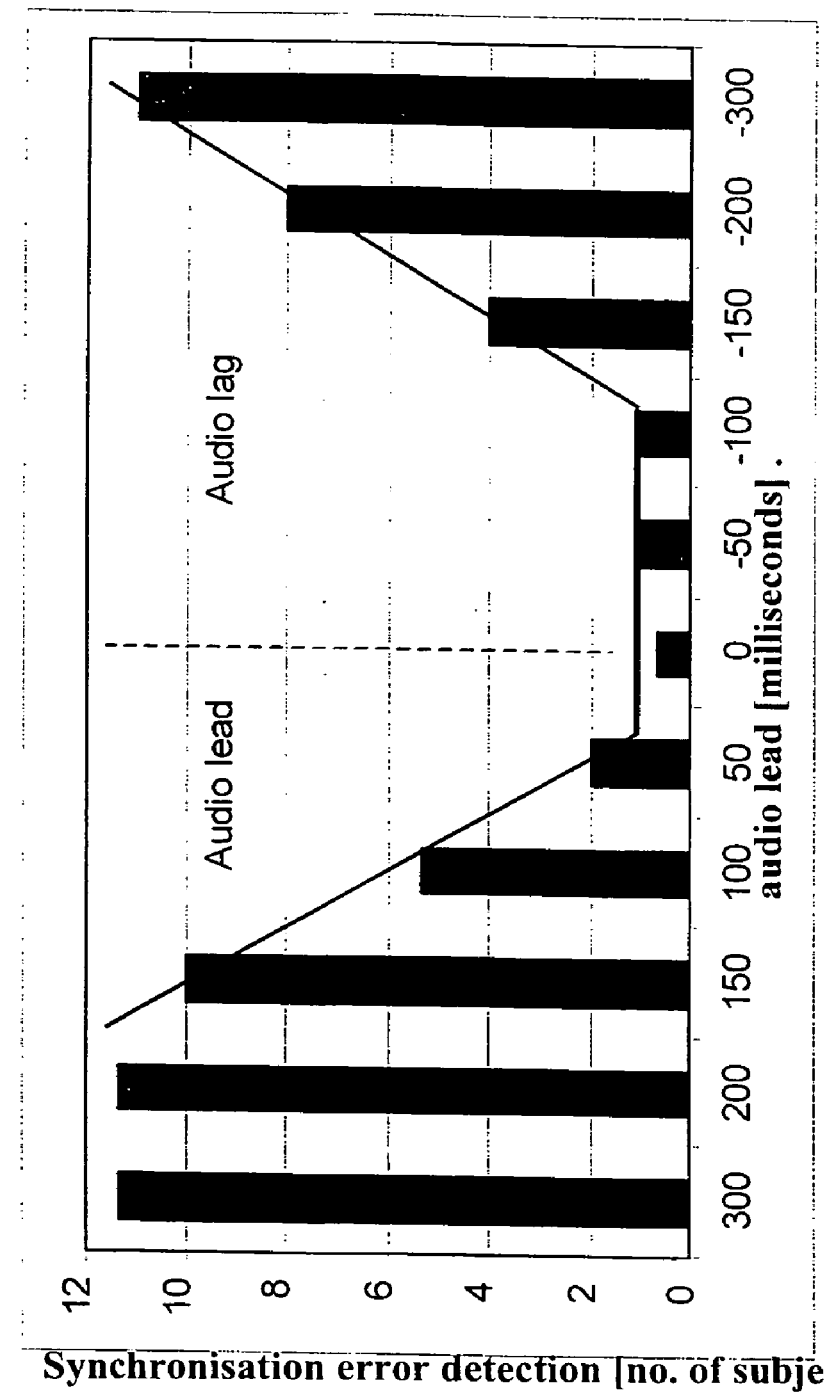
FIGS. 3 and 4 illustrate experimental data indicative of the behaviour modelled by the synchronisation measurement component.

FIG. 3 shows the number of subjects detecting a synchronisation error averaged across three stimulus types. These types are:

(1) an object entering and leaving the field of vision, as an example of a brief visual cue;

(2) an object entering and remaining in the field of vision, as an example of a longer visual cue, and (3) a speech cue (talking head).

Each visual cue is accompanied by an audible cue generated by the object in the visual cue.

It will be seen from FIG. 3 that there is an underlying feature of temporal asymmetry in the perceptibility of synchronisation errors. Synchronisation errors in which the audio signal leads the visual signal are perceptually more important than those in which the visual signal leads the audio signal by the same interval. This is probably because we are used to receiving audio cues later than corresponding visual cues in ordinary experience, since in the natural world the associated physical signals travel at vastly different speeds (340 metres/second for sound and 300 million metres/second for light).

The general form of the results reflects the recommended synchronisation thresholds given in Recommendation J.100 of the ITU, i.e. 20 milliseconds for audio lead and 40 milliseconds for audio lag. This recommendation provides a fixed figure for all content types and is intended to ensure that synchronisation errors remain imperceptible. This approach is suitable for the specification of broadcast systems.

Figure 4:
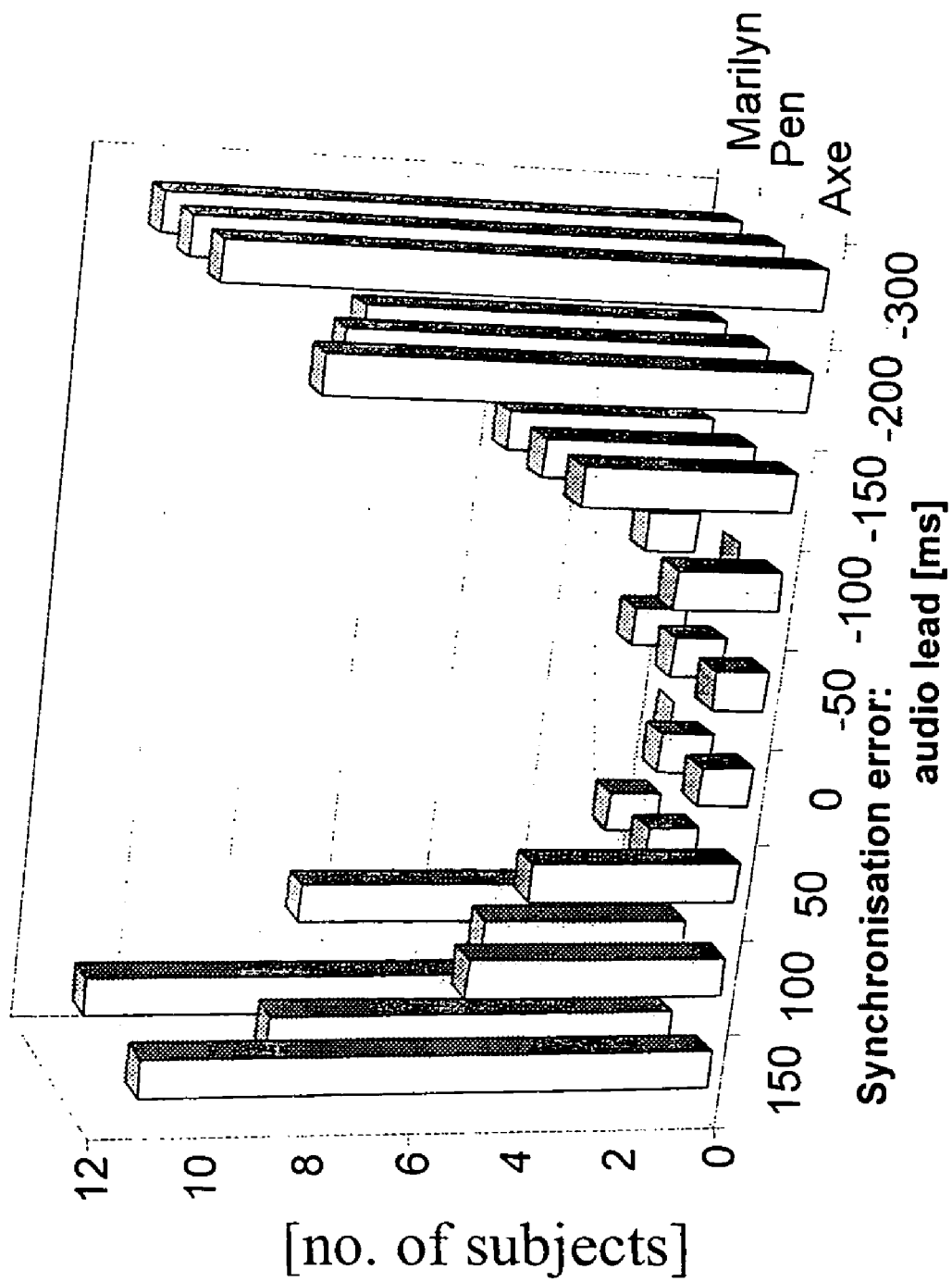

However, it has been found that synchronisation error detection is greater for a long visual cue than for a short visual cue or a visual speech cue. FIG. 4 shows the results for these two stimulus types, and for a "talking head", which is a special case because human subjects are highly specialised for speech perception compared with more general content. The two non-speech sound stimuli selected were both relatively abrupt, as these make greater demands on synchronisation than would a continuous noise.

These are shown on a single graph for ease of comparison.

The key features of these results are:

(i) The general trend in error detection asymmetry is apparent for all stimulus types .

(ii) The duration/distinctness of the long ("axe") stimulus, in which the object generating the sound appears, and then remains in view, results in greater probability of error detection than for the shorter ("pen") stimulus, in which the object appears with the sound but rapidly goes out of view again.

(iii) Error detection for the speech ("Marilyn") stimulus is consistent with the other two stimuli when the audio lags the video, but is greater than for either of the other stimuli when the audio leads the video.

The probability of synchronisation error detection therefore varies with the duration and distinctness of the visual stimulus. Moreover, there is a high sensitivity to synchronisation errors in speech when the audio signal leads the video. This latter result was not expected, since it has been previously argued that during speech perception it is not possible to resolve the timing of "error" events more accurately than the duration of the semantic elements of the speech stream, see for example Chapter 7 in [Handel, S. "Listening: an introduction to the perception of auditory events", MIT Press, 1989]. It appears in practice that, perhaps due to the short duration of certain semantic units such as consonant onsets, subjects are very sensitive to audio lead synchronisation errors with talking-head/speech stimuli.

What is claimed is:

1. A method of determining the subjective quality of an audio-visual stimulus, comprising:

measuring the actual synchronisation errors between the audio and visual elements of the stimulus;

identifying characteristics of audio and visual cues in th stimulus that are indicative of the significance of synchronization errors;

generating a measure of subjective quality from said synchronisation errors and characteristics;

analysing the audio and visual elements of the stimulus for the presence of said characteristic features indicative of the significance of synchronisation errors; and modifying the measure of subjective quality derived from the synchronisation errors and characteristics according to whether said characteristics features are present.

2. A method according to claim 1, wherein the characteristics of the audio and visual cues are used to generate one or more synchronisation error tolerance values.

3. A method as claimed in claim 2, wherein the audio-visual stimulus is monitored for occurrences of synchronisation errors exceeding said tolerances values.

4. A method according to claim 3, wherein the means generating the stimulus is controlled to maintain the synchronisation in a predetermined relationship with the said tolerance values.

5. A method according to claim 4, wherein the resulting measure of subjective quality is used to control the operation of an avatar animation process.

6. Apparatus for determining the subjective quality of an audio-visual stimulus, comprising:

means for measuring the actual synchronisation errors between the audio and visual elements of the stimulus;

means for identifying characteristics of audio and visual elements of the stimulus that are indicated of the significance of synchronisation errors;

means for generating a measure of subjective quality from said synchronisation errors and characteristics;

means for analysing the audio and visual elements of the stimulus for the presence of said characteristics features indicative of the significance of synchronisation errors; and means for modifying the measure of subjective quality derived from the synchronisation errors and characteristics according to whether said characteristic features are present.

7. Apparatus according to claim 6, wherein the means for identifying cue characteristics generates one or more synchronisation error tolerance values.

8. Apparatus as claimed in claim 7, comprising means for monitoring the audio-visual stimulus for occurrences of synchronisation errors exceeding said tolerance values.

9. Apparatus according to claim 8, comprising means for controlling the means generating the stimulus to maintain the synchronisation in a predetermined relationship with the said tolerance values.

10. Apparatus according to claim 9, further comprising animation process means controlled by the subjective quality measurement means to generate an animated image.

11. A method according to claim 1, wherein the audio-visual stimulus is a "talking-head."

12. An apparatus according to claim 6, wherein the audio-visual stimulus is a "talking-head."

* * * * *